US007120662B2

(12) United States Patent
Vange et al.

(10) Patent No.: US 7,120,662 B2
(45) Date of Patent: Oct. 10, 2006

(54) CONDUCTOR GATEWAY PRIORITIZATION PARAMETERS

(75) Inventors: Mark Vange, Toronto (CA); Glenn Sydney Wilson, Toronto (CA); Marc Plumb, Toronto (CA); Michael Kouts, Toronto (CA)

(73) Assignee: Circadence Corporation, Boulder, CO (US)

( * ) Notice: Subject to any disclaimer, the term of this patent is extended or adjusted under 35 U.S.C. 154(b) by 615 days.

(21) Appl. No.: 09/835,869

(22) Filed: Apr. 16, 2001

(65) Prior Publication Data

US 2002/0019853 A1 Feb. 14, 2002

Related U.S. Application Data

(60) Provisional application No. 60/197,490, filed on Apr. 17, 2000.

(51) Int. Cl.
*G06F 15/16* (2006.01)
*H04B 1/66* (2006.01)
*G06F 11/00* (2006.01)

(52) U.S. Cl. .................. 709/203; 375/240; 370/235
(58) Field of Classification Search ............... 709/203, 709/207, 217–219, 223–226; 370/235, 252, 370/346

See application file for complete search history.

(56) References Cited

U.S. PATENT DOCUMENTS

| | | | |
|---|---|---|---|
| 5,179,708 A * | 1/1993 | Gyllstrom et al. | 719/314 |
| 5,258,983 A | 11/1993 | Lane et al. | |
| 5,535,335 A * | 7/1996 | Cox et al. | 709/221 |
| 5,673,322 A | 9/1997 | Pepe et al. | |
| 5,729,542 A * | 3/1998 | Dupont | 370/346 |
| 5,757,771 A * | 5/1998 | Li et al. | 370/235 |
| 5,933,412 A | 8/1999 | Choudhury et al. | |

(Continued)

FOREIGN PATENT DOCUMENTS

EP 0384339 A2 8/1990

(Continued)

OTHER PUBLICATIONS

K. Sriram, "Methodologies for bandwidth allocation, transmission scheduling, and congestion avoidance in broadband ATM networks", Computer Networks and ISDN Systems, 26 (1993) pp. 43-59.

(Continued)

*Primary Examiner*—Wen-Tai lin
(74) *Attorney, Agent, or Firm*—Stuart T. Langley; Kent A. Lembke; Hogan & Hartson

(57) ABSTRACT

A system and method for prioritizing sets of information transmitted across a network. The priority of a set of information determines the order in which it is transmitted and other characteristics associated with the set of information, such as connection reliability. In one embodiment, the set of information is a packet, and the packet is prioritized upon receipt by an intermediary network computer. The intermediary transmits packets based on the priority associated with each packet. Priority information includes priority parameters, priority values, parameter valuation information, and weighting algorithms. Priority parameter types and values are based on attributes associated with a set of information, such as user identification and requested content. Priority types and values, which are based on priority parameter types and values, determine a component of the priority associated with a set of information. Parameter valuation information associates priority parameters with priority values. Weighting algorithms are used to determine a priority based on one or more priority values.

22 Claims, 8 Drawing Sheets

U.S. PATENT DOCUMENTS

| | | | |
|---|---|---|---|
| 5,951,694 A | | 9/1999 | Choquier et al. |
| 5,991,302 A | * | 11/1999 | Berl et al. ................... 370/400 |
| 5,999,971 A | | 12/1999 | Buckland |
| 6,006,264 A | | 12/1999 | Colby et al. |
| 6,023,456 A | * | 2/2000 | Chapman et al. ........... 370/252 |
| 6,034,964 A | | 3/2000 | Fukushima et al. |
| 6,167,449 A | | 12/2000 | Arnold et al. |
| 6,418,169 B1 | * | 7/2002 | Datari ................... 375/240.28 |
| 6,459,682 B1 | * | 10/2002 | Ellesson et al. ............ 370/235 |
| 2002/0049608 A1 | * | 4/2002 | Hartsell et al. ................. 705/1 |

FOREIGN PATENT DOCUMENTS

| | | |
|---|---|---|
| EP | 0794491 A2 | 9/1997 |
| EP | 0828214 A2 | 3/1998 |
| EP | 0942363 A2 | 9/1999 |
| GB | 2309558 | 7/1997 |
| WO | WO 97/29424 | 8/1997 |
| WO | WO 97/30392 | 8/1997 |
| WO | WO 98/26553 | 6/1998 |
| WO | WO 98/28938 | 7/1998 |
| WO | WO 99/09689 | 2/1999 |
| WO | WO 99/18534 | 4/1999 |
| WO | WO 99/57620 | 11/1999 |
| WO | WO 99/57637 | 11/1999 |

OTHER PUBLICATIONS

V. P. Kumar, et al., "*Beyond Best Effort: Router Architectures for the Differentiated Services of Tomorrow's Internet*", May 1998, IEEE Communications Magazine, pp. 152-164.

R. M. Adler, "Distributed Coordination Models for Client/Server Computing", Apr. 1995, IEEE Computer, pp. 14-22.

G.-C. Lai, et al., "Support QoS in IP over ATM", Computer Communications, 22 (1999) pp. 411-418.

* cited by examiner

CONDUCTOR GATEWAY PRIORITIZATION PARAMETERS

RELATED APPLICATIONS

The present invention claims priority from U.S. Provisional Patent Application No. 60/197,490 entitled CONDUCTOR GATEWAY filed on Apr. 17, 2000.

BACKGROUND OF THE INVENTION

1. Field of the Invention

The present invention relates, in general, to a system and method for prioritizing information across a network, and, more particularly, to software, systems and methods for prioritizing information transmitted across a public network, such as the Internet.

2. Relevant Background

Increasingly, business data processing systems, entertainment systems, and personal communications systems are implemented by computers across networks that are interconnected by Internetworks (e.g., the Internet). The Internet is rapidly emerging as the preferred system for distributing and exchanging data. Data exchanges support applications including e-commerce, broadcast and multicast messaging, videoconferencing, gaming, and the like.

The Internet is a collection of disparate computers and networks coupled together by a web of interconnections using standardized communications protocols. The Internet is characterized by its vast reach as a result of its wide and increasing availability and easy access protocols. Unfortunately, the heterogeneous nature of the Internet results in variable bandwidth and quality of service between points. The latency and reliability of data transport is largely determined by the total amount of traffic on the Internet and so varies wildly seasonally and throughout the day. Other factors that affect quality of service include equipment outages and line degradation that force packets to be rerouted, damaged and/or dropped. Also, routing software and hardware limitations within the Internet infrastructure may create bandwidth bottlenecks even when the mechanisms are operating within specifications.

Internet transport protocols do not effectively discriminate between users. Data packets are passed between routers and switches that make up the Internet fabric based on the hardware's instantaneous view of the best path between source and destination nodes specified in the packet. Because each packet may take a different path, the latency of a packet cannot be guaranteed and, in practice, varies significantly. Although Internet infrastructure components have been developed that provide some level of packet prioritization, these components have limited distribution. Because of this limited deployment, web site operators cannot depend on prioritization services to be available throughout the network, and in reality can only depend on a small portion of the Internet being served by such components. Moreover, components that are available may require modifications to the web site to operate. Hence, in large part data packets are routed through the Internet without any prioritization based on content.

Prioritization has not been a major issue with conventional networks such as local area networks (LANs) and wide area networks (WANs) that primarily handle well characterized data traffic between a known and controlled set of network nodes. In such environments, the network administrators are in control of network traffic and can effectively police bandwidth consumption, resource availability and distribution, and other variables that affect quality of service. In contrast, public networks such as the Internet, involve data traffic that is out of control of any particular network administrator. However, because of their wide availability, there is an increasing desire to provide network services using public networks, such as the Internet. At the same time, there is an increasing demand for network applications that cannot tolerate high and variable latency. This situation is complicated when the application is to be run over the Internet where latency and variability in latency are many times greater than in LAN and WAN environments.

A particular need exists in environments that involve multiple users accessing a network resource such as a web server. Examples include broadcast, multicast and videoconferencing as well as most electronic commerce (e-commerce) applications. In these applications, it is important to maintain a reliable connection so that the server and clients remain synchronized and information is not lost.

In e-commerce applications, it is important to provide a satisfying buying experience that leads to a purchase transaction. To provide this high level of service, a web site operator must ensure that data is delivered to the customer in the most usable and efficient fashion. Also, the web site operator must ensure that critical data received from the customer is handled with priority.

Because the few techniques that provide traffic prioritization are not widely distributed in public networks, the e-commerce site owner has had little or no control over the transport mechanisms through the Internet that affect the latency and quality of service. This is akin to a retailer being forced to deal with a customer by shouting across the street, never certain how often what was said must be repeated, and knowing that during rush hour communication would be nearly impossible. While efforts are continually being made to increase the capacity and quality of service afforded by the Internet, it is contemplated that congestion will always impact the ability to predictably and reliably offer a specified level of service. Moreover, the change in the demand for bandwidth increases at a greater rate than does the change in bandwidth supply, ensuring that congestion will continue to be an issue into the foreseeable future. A need exists for a system to exchange data over the Internet that provides a high quality of service even during periods of congestion.

Many e-commerce transactions are abandoned by the user because system performance degradation frustrates the purchaser before the transaction is consummated. While a data exchange that is abandoned while a customer is merely browsing through a catalog may be tolerable, abandonment when the customer is just a few clicks away from a purchase is highly undesirable. However, existing Internet transport mechanisms and systems do not allow the e-commerce site owner any effective ability to offer differentiated service levels to the "just browsing" and the "about-to-buy" customers. In fact, the vagaries of the Internet may lead to the casual browser receiving a higher quality of service while the about-to-buy customer becomes frustrated and abandons the transaction.

SUMMARY OF THE INVENTION

In accordance with this invention, the above problems are addressed by prioritizing sets of information transmitted across a network. A set of information comprises, for example, one or more data packets related to a particular user, a particular session, a particular server, or particular resources within a server. The effective priority of a set of information is used to provide differential levels of service to the sets of information. For example, the effective priority determines the order in which the associated information is transmitted and/or other characteristics associated with the information, such as connection reliability.

In one embodiment, the set of information is a packet, and the packets are prioritized upon receipt by an intermediary network computer. The packets are prioritized by computing the effective priority based upon one or more priority factors. The priority factors are determined from priority parameters extracted from the data packets themselves in a particular implementation. The intermediary network computer transmits packets based on the effective priority associated with each packet.

Priority information includes priority parameters and priority values. While priority values are ultimately used to compute the effective priority, the priority values are communicated between entities as priority parameters of the data packets being transmitted. A priority value may be directly defined by the associated priority parameter (e.g., the parameter has a value equal to the priority value). Alternatively, the priority parameter may indirectly define the associated priority value (e.g., the parameter specifies a URL and the URL is, in turn, associated with a priority value). Priority information also includes weighting algorithms used to compute an effective priority from a plurality of priority values.

Priority information is characterized by type and value. Generally, priority types include user priority and content priority. User priority refers, for example, to values and parameters such as user identification, user address, session identification, and similar information associated with a particular user or group of users. In a particular embodiment, user priority information includes site-specified user priority (SSUP), domain-specific user priority (DSUP), session-specific user priority, and global user priority (GUP) information. Content priority information refers, for example, content identification (e.g., provided by a site owner by tagging, separate data structure, and the like), content type, URL, server address, and similar information associated with the content being communicated by a particular data packet. Content generally refers to any services or data provided by a network resource and may include web pages, application services, database services, file services, news services, mail services, and the like.

In one embodiment, priority parameters are transmitted with the sets of information to an intermediate computing device that performs the prioritization function. The intermediate entity determines priority values from the priority parameters, and applies the weighting algorithms to determine an effective priority value. In a particular example, weighting algorithms are transmitted via an out-of-band management system.

DETAILED DESCRIPTION OF THE PREFERRED EMBODIMENTS

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments as well as small network environments such as LAN systems.

Figure 1:
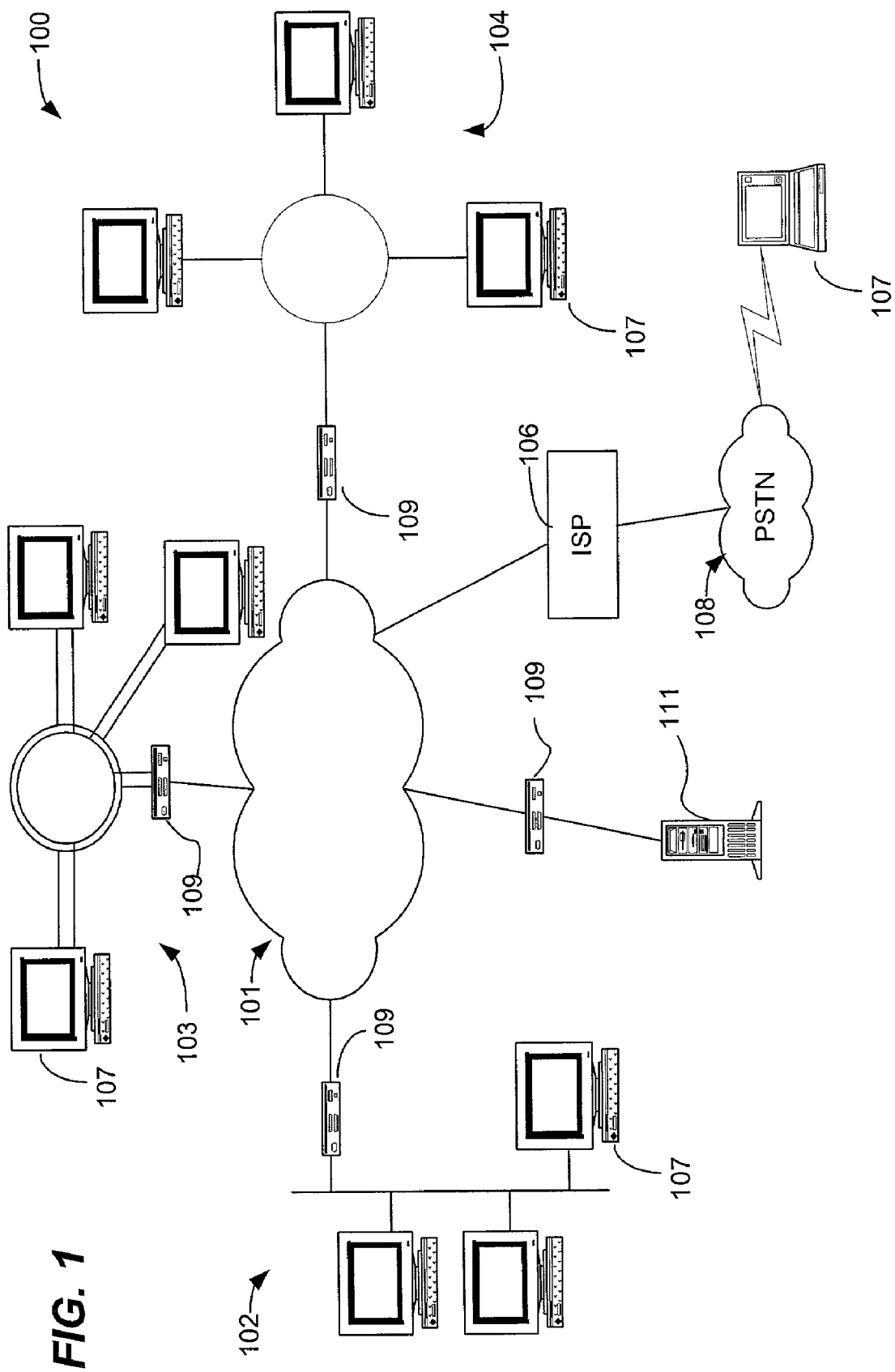
FIG. 1 illustrates a general distributed computing environment in which the present invention is implemented.

FIG. 1 shows an exemplary computing environment 100 in which the present invention may be implemented. Environment 100 includes a plurality of local networks such as Ethernet network 102, FDDI network 103 and Token ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example a UNIX, Novell, or Windows NT networks, and/or peer-to-peer type networking. Each network will include distributed storage implemented in each device and typically includes some mass storage device coupled to or managed by a server computer. Network 101 comprises, for example, a public network, such as the Internet, or another network mechanism, such as a fibre channel fabric or conventional WAN technologies.

Local networks 102, 103 and 104 include one or more network appliances 107. One or more network appliances 107 may be configured as an application and/or file server. Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 which exist throughout network 101 as well as at the edge of network 101 as shown in FIG. 1, provide a physical connection between the various devices through network 101. Routers 109 may implement desired access and security protocols to manage access through network 101.

Network appliances 107 may also couple to network 101 through public switched telephone network (PSTN) 108 using copper or wireless connection technology. In a typical environment, an Internet service provider (ISP) 106 supports a connection to network 101 as well as PSTN 108 connections to network appliances 107.

Network appliances 107 may be implemented as any kind of network appliance having sufficient computational function to execute software needed to establish and use a connection to network 101. Network appliances 107 may comprise workstation and personal computer hardware executing commercial operating systems such as Unix variants, Micrsosoft Windows, Apple OS, and the like. At the same time, some appliances 107 comprise portable or handheld devices such as personal digital assistants and cell phones executing operating system software such as PalmOS, WindowsCE, and the like. Moreover, the present invention is readily extended to network devices such as office equipment, vehicles, and personal communicators that occasionally connect through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

Figure 2:
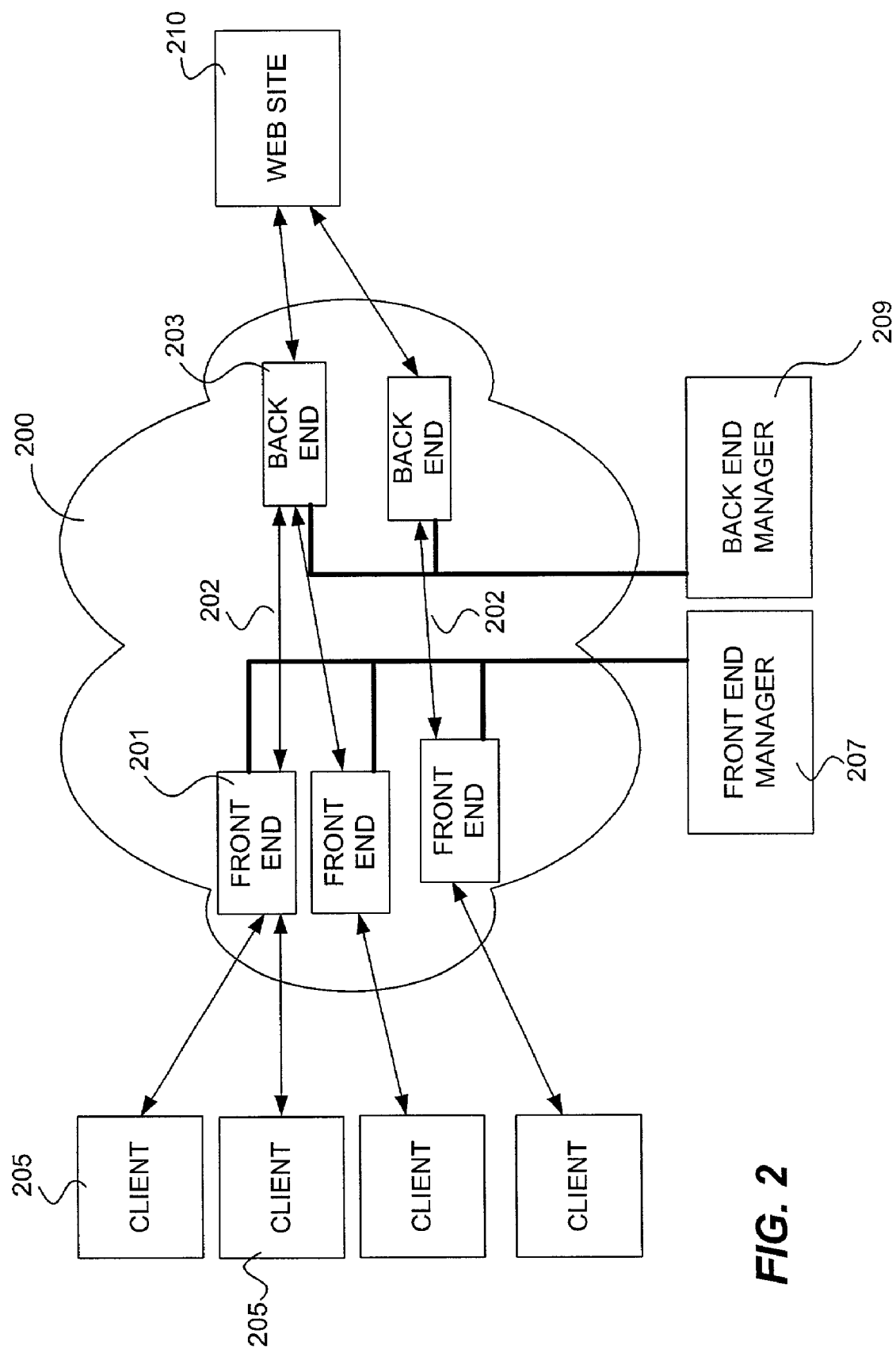
FIG. 2 shows in block-diagram form significant components of a system in accordance with the present invention.

The preferred embodiments of the present invention involve one or more intermediary computers (e.g., front-end 201 and back-end 203) located between a client 205 and a server 210 shown in FIG. 2. More essentially, however, the present invention involves communication and use of prioritization information between a client 205 and server 210 and so may be implemented without intermediary computers. However, the use of intermediary computers eases or eliminates special configuration of the client 205 and server 210 and enables the use of protocols that allow differential service through network 101 in addition to differential service at the client 205 and server 210. Accordingly, the preferred embodiments using intermediary computers are described herein, however, it should be expressly understood that the invention contemplates extension to systems without intermediary computers.

Using intermediate computers, the present invention operates in a manner akin to a private network 200 implemented within the Internet infrastructure. Private network 200 expedites and prioritizes communications between a client 205 and a web site 210. In the specific examples herein client 205 comprises a network-enabled graphical user interface such as a web browser. However, the present invention is readily extended to client software other than conventional web browser software. Any client application that can access a standard or proprietary user level protocol for network access is a suitable equivalent. Examples include client applications that act as front-ends for file transfer protocol (FTP) services, Voice over Internet Protocol (VOIP) services, network news protocol (NNTP) services, multi-purpose Internet mail extensions (MIME) services, post office protocol (POP) services, simple mail transfer protocol (SMTP) services, as well as Telnet services. In addition to network protocols, the client application may serve as a front-end for a network application such as a database management system (DBMS) in which case the client application generates query language (e.g., structured query language or "SQL") messages. In wireless appliances, a client application functions as a front-end to a wireless application protocol (WAP) service.

For convenience, the term "web site" is used interchangeably with "web server" in the description herein, although it should be understood that a web site comprises a collection of content, programs and processes implemented on one or more web servers. A web server is a specific example of a network server or network resource that provides services (e.g., data or application services) in response to received requests. A web site is owned by the content provider such as an e-commerce vendor, whereas a web server refers to set of programs running on one or more machines coupled to an Internet node. The web site 210 may be hosted on the site owner's own web server, or hosted on a web server owned by a third party. A web hosting center is an entity that implements one or more web sites on one or more web servers using shared hardware and software resources across the multiple web sites. In a typical web infrastructure, there are many web browsers, each of which has a TCP connection to the web server in which a particular web site is implemented. The preferred implementation of the present invention adds two components to a conventional infrastructure: a front-end 201 and back-end 203. Front-end 201 and back-end 203 are coupled by a managed data communication link 202 that forms, in essence, a private network.

Front-end mechanism 201 serves as an access point for client-side communications. Front-end 201 implements a gateway that functions as an intermediate computer to prioritize data traffic destined for the web server(s) implementing web site 210. From the perspective of client 205, front-end 201 appears to be the web site 210. Front-end 201 comprises, for example, a computer that sits "close" to clients 205. By "close", it is meant that the average latency associated with a connection between a client 205 and a front-end 201 is less than the average latency associated with a connection between a client 205 and a web site 210. Desirably, front-end computers have as fast a connection as possible to the clients 205. For example, the fastest available connection may be implemented in point of presence (POP) of ISP 106 used by a particular client 205. However, the placement of the front-ends 201 can limit the number of browsers that can use them. Because of this, in some applications it is more practical to place one front-end computer in such a way that several POPs can connect to it. Greater distance between front-end 201 and clients 205 may be desirable in some applications as this distance will allow for selection amongst a greater number front-ends 201 and thereby provide significantly different routes to a particular back-end 203. This may offer benefits when particular routes and/or front-ends become congested or otherwise unavailable.

Transport mechanism 202 is implemented by cooperative actions of the front-end 201 and back-end 203. Back-end 203 processes and directs data communication to and from web site 210. Transport mechanism 202 communicates data packets using a proprietary protocol over the public Internet infrastructure in the particular example. Hence, the present invention does not require heavy infrastructure investments and automatically benefits from improvements implemented in the general-purpose network 101. Unlike the general purpose Internet, front-end 201 and back-end 203 are programmably assigned to serve accesses to a particular web site 210 at any given time.

It is contemplated that any number of front-end and back-end mechanisms may be implemented cooperatively to support the desired level of service required by the web site owner. The present invention implements a many-to-many mapping of front-ends to back-ends. Because the front-end to back-end mappings can by dynamically changed, a fixed hardware infrastructure can be logically reconfigured to map more or fewer front-ends to more or fewer back-ends and web sites or servers as needed.

Front-end 201 together with back-end 203 function to reduce traffic across the TMP link 202 and to prioritized data transport. In addition to being prioritized, traffic across the TMP link 202 is reduced by compressing data and serving browser requests from cache(s) at front-end 201 and/or back-end 203 for fast retrieval. Also, the use of a proprietary protocol results in fewer request:acknowledge pairs across the TMP link 202 as compared to the number required to send the packets individually between front-end 201 and back-end 203. This action reduces the overhead associated with transporting a given amount of data, although conventional request:acknowledge traffic is still performed on the links coupling the front-end 201 to client 205 and back-end 203 to a web server. Moreover, resend traffic is significantly reduced further reducing the traffic. In an alternative embodiment, permanent connections between back-end 203 and a web server 210 are maintained.

In one embodiment, front-end 201 and back-end 203 are closely coupled to the Internet backbone. This means they have high bandwidth connections, can expect fewer hops, and have more predictable packet transit time than could be expected from a general-purpose connection. Although it is desirable to have low latency connections between front-ends 201 and back-ends 203, a particular strength of the present invention is its ability to deal with latency by enabling efficient transport and traffic prioritization. Hence, in other embodiments front-end 201 and/or back-end 203 may be located farther from the Internet backbone and closer to clients 205 and/or web servers 210. Such an implementation reduces the number of hops required to reach a front-end 201 while increasing the number of hops within the TMP link 202 thereby yielding control over more of the transport path to the management mechanisms of the present invention.

Clients 205 no longer conduct all data transactions directly with the web server 210. Instead, clients 205 conduct some and preferably a majority of transactions with front-ends 201, which implement the functions of web server 210. Client data is then sent, using TMP link 202, to the back-end 203 and then to the web server 210. Running multiple clients 205 over one large connection provides several advantages:

Since all client data is mixed, each client can be assigned a priority. Higher priority clients, or clients requesting higher priority data, can be given preferential access to network resources so they receive access to the channel sooner while ensuring low-priority clients receive sufficient service to meet their needs.

The large connection between a front-end 201 and back-end 203 can be permanently maintained, shortening the many TCP/IP connection sequences normally required for many clients connecting and disconnecting.

Using a proprietary protocol allows front-end 201 implement a prioritization function to selectively send packets according to effective priority values associated with the packets and to improve data throughput and makes better use of existing bandwidth during periods when the network is congested.

A particular advantage of the architecture shown in FIG. 2 is that it is readily scaled. Any number of client machines 205 may be supported. In a similar manner, a web site owner may choose to implement a site using multiple web servers 210 that are co-located or distributed throughout network 101. To avoid congestion, additional front-ends 201 may be implemented or assigned to particular web sites. Each front-end 201 is dynamically re-configurable by updating address parameters to serve particular web sites. Client traffic is dynamically directed to available front-ends 201 to provide load balancing. Hence, when quality of service drops because of a large number of client accesses, an additional front-end 201 can be assigned to the web site and subsequent client requests directed to the newly assigned front-end 201 to distribute traffic across a broader base.

In the particular examples, front-end to back-end assignment is implemented by a front-end manager component 207 that communicates with multiple front-ends 201 to provide administrative and configuration information to front-ends 201. Each front-end 201 includes data structures for storing the configuration information, including information identifying the IP addresses of back-ends 203 and/or web servers 210 to which they are currently assigned. Other administrative and configuration information stored in front-end 201 may include information for prioritizing data from and to particular clients, quality of service information, and the like.

Similarly, additional back-ends 203 can be assigned to a web site to handle increased traffic. Back-end manager component 209 couples to one or more back-ends 203 to provide centralized administration and configuration service. Back-ends 203 include data structures to hold current configuration state, quality of service information and the like. In the particular examples front-end manager 207 and back-end manager 209 serve multiple web sites 210 and so are able to manipulate the number of front-ends and back-ends assigned to each web site 210 by updating this configuration information. When the congestion for the site subsides, the front-end 201 and back-end 203 can be reassigned to other, busier web sites.

In the case of web-based environments, front-end 201 is implemented using custom or off-the-shelf web server software. Alternatively, front-end 201 may be implemented as a server process running in a network component such as a router or any other part of a network infrastructure where sufficient data processing capability can be implemented. Front-end 201 is readily extended to support other, non-web-based protocols, however, and may support multiple protocols for varieties of client traffic. Front-end 201 processes the data traffic it receives, regardless of the protocol of that traffic, to a form suitable for transport by TMP 202 to a back-end 203. Hence, most of the functionality implemented by front-end 201 is independent of the protocol or format of the data received from a client 205. Hence, although the discussion of the exemplary embodiments herein relates primarily to front-end 201 implemented as a web server, it should be noted that, unless specified to the contrary, web-based traffic management and protocols are merely examples and not a limitation of the present invention.

Figure 3:
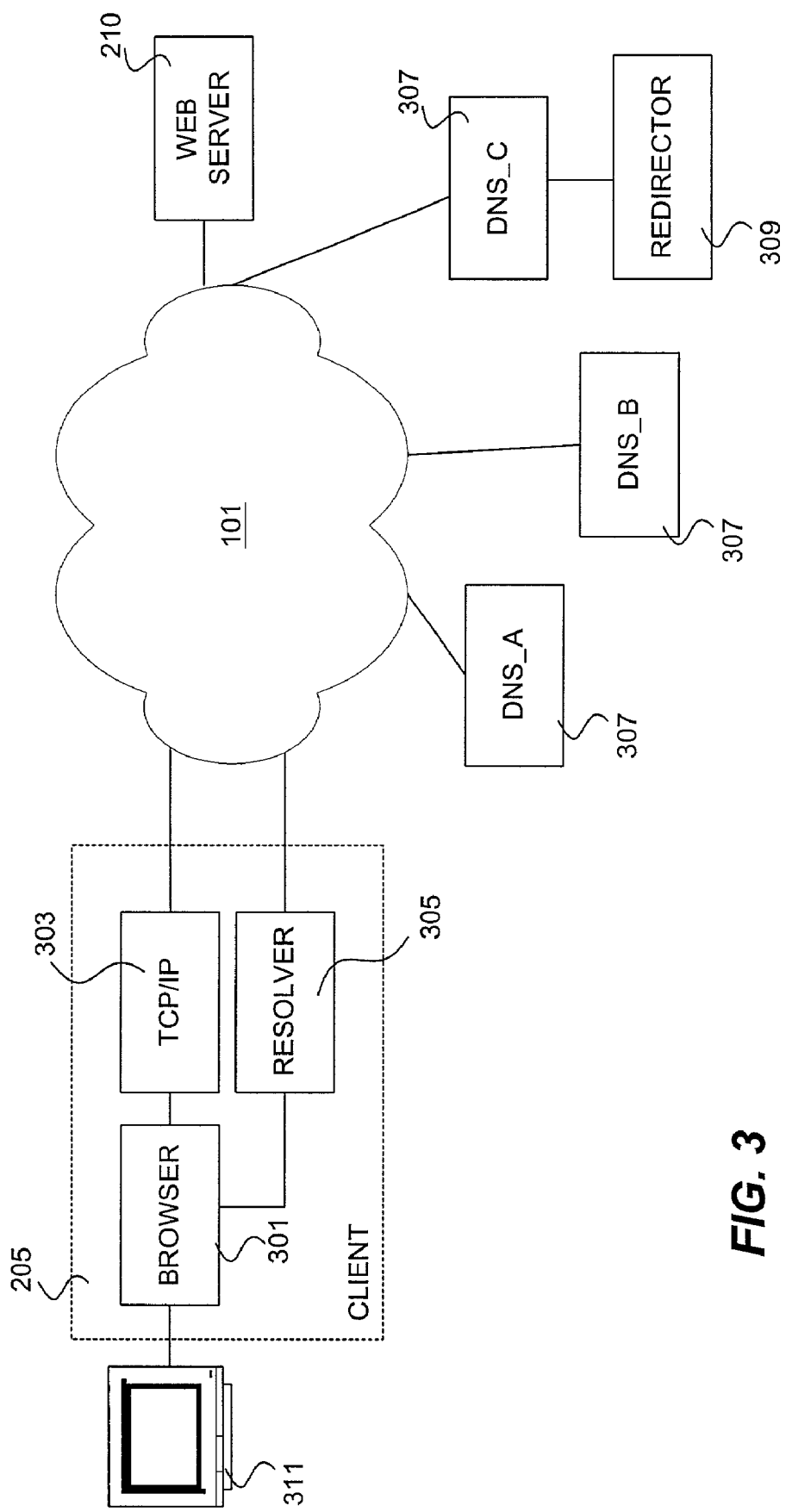
FIG. 3 shows a domain name system used in an implementation of the present invention.

In order for a client 205 to obtain service from a front-end 201, it must first be directed to a front-end 201 that can provide the desired service. Preferably, client 205 does not need to be aware of the location of front-end 201, and initiates all transactions as if it were contacting the originating server 210. FIG. 3 illustrates a domain name server (DNS) redirection mechanism that illustrates how a client 205 is connected to a front-end 201. The DNS systems is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as routines within a single software product.

Browser 301 functions as a graphical user interface to implement user input/output (I/O) through monitor 311 and associated keyboard, mouse, or other user input device (not shown). Browser 301 is usually used as an interface for web-based applications, but may also be used as an interface for other applications such as email and network news, as well as special-purpose applications such as database access, telephony, and the like. Alternatively, a special-purpose user interface may be substituted for the more general-purpose browser 301 to handle a particular application.

TCP/IP stack 303 communicates with browser 301 to convert data between formats suitable for browser 301 and IP format suitable for Internet traffic. TCP/IP stack also implements a TCP protocol that manages transmission of packets between client 205 and an ISP or equivalent access point. IP protocol requires that each data packet include, among other things, an IP address identifying a destination node. In current implementations the IP address comprises a 32-bit value that identifies a particular Internet node. Non-IP networks have similar node addressing mechanisms. To provide a more user-friendly addressing system, the Internet implements a system of domain name servers that map alpha-numeric domain names to specific IP addresses. This system enables a name space that is more consistent reference between nodes on the Internet and avoids the need for users to know network identifiers, addresses, routes and similar information in order to make a connection.

The domain name service is implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. These master files are updated by local system administrators. Master files typically comprise text files that are read by a local name server, and hence become available through the name servers 307 to users of the domain system.

The user programs (e.g., clients 205) access name servers through standard programs such as resolver 305. Resolver 305 includes an address of a DNS 307 that serves as a primary name server. When presented with a reference to a domain name (e.g., http://www.circadence.com), resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner, the resolver 305 becomes aware of the IP address mapping which is supplied to TCP/IP component 303. Client 205 may cache the IP address mapping for future use. TCP/IP component 303 uses the mapping to supply the correct IP address in packets directed to a particular domain name so that reference to the DNS system need only occur once.

In accordance with the present invention, at least one DNS server 307 is owned and controlled by system components of the present invention. When a user accesses a network resource (e.g., a web site), browser 301 contacts the public DNS system to resolve the requested domain name into its related IP address in a conventional manner. In a first embodiment, the public DNS performs a conventional DNS resolution directing the browser to an originating server 210 and server 210 performs a redirection of the browser to the system owned DNS server (i.e., DNC_C in FIG. 3). In a second embodiment, domain:address mappings within the DNS system are modified such that resolution of the of the originating server's domain automatically return the address of the system-owned DNS server (DNS_C). Once a browser is redirected to the system-owned DNS server, it begins a process of further redirecting the browser 301 to the best available front-end 201.

Unlike a conventional DNS server, however, the system-owned DNS_C in FIG. 3 receives domain:address mapping information from a redirector component 309. Redirector 309 is in communication with front-end manager 207 and back-end manager 209 to obtain information on current front-end and back-end assignments to a particular server 210. A conventional DNS is intended to be updated infrequently by reference to its associated master file. In contrast, the master file associated with DNS_C is dynamically updated by redirector 309 to reflect current assignment of front-end 201 and back-end 203. In operation, a reference to web server 210 (e.g., http://www.circadence.com) may result in an IP address returned from DNS_C that points to any selected front-end 201 that is currently assigned to web site 210. Likewise, web site 210 can identify a currently assigned back-end 203 by direct or indirect reference to DNS_C.

Front-end 201 typically receives information directly from front-end manager 207 about the address of currently assigned back-ends 203. Similarly, back-end 203 is aware of the address of a front-end 201 associated with each data packet. Hence, reference to the domain system is not required to map a front-end 201 to its appropriate back-end 203.

Figure 4:
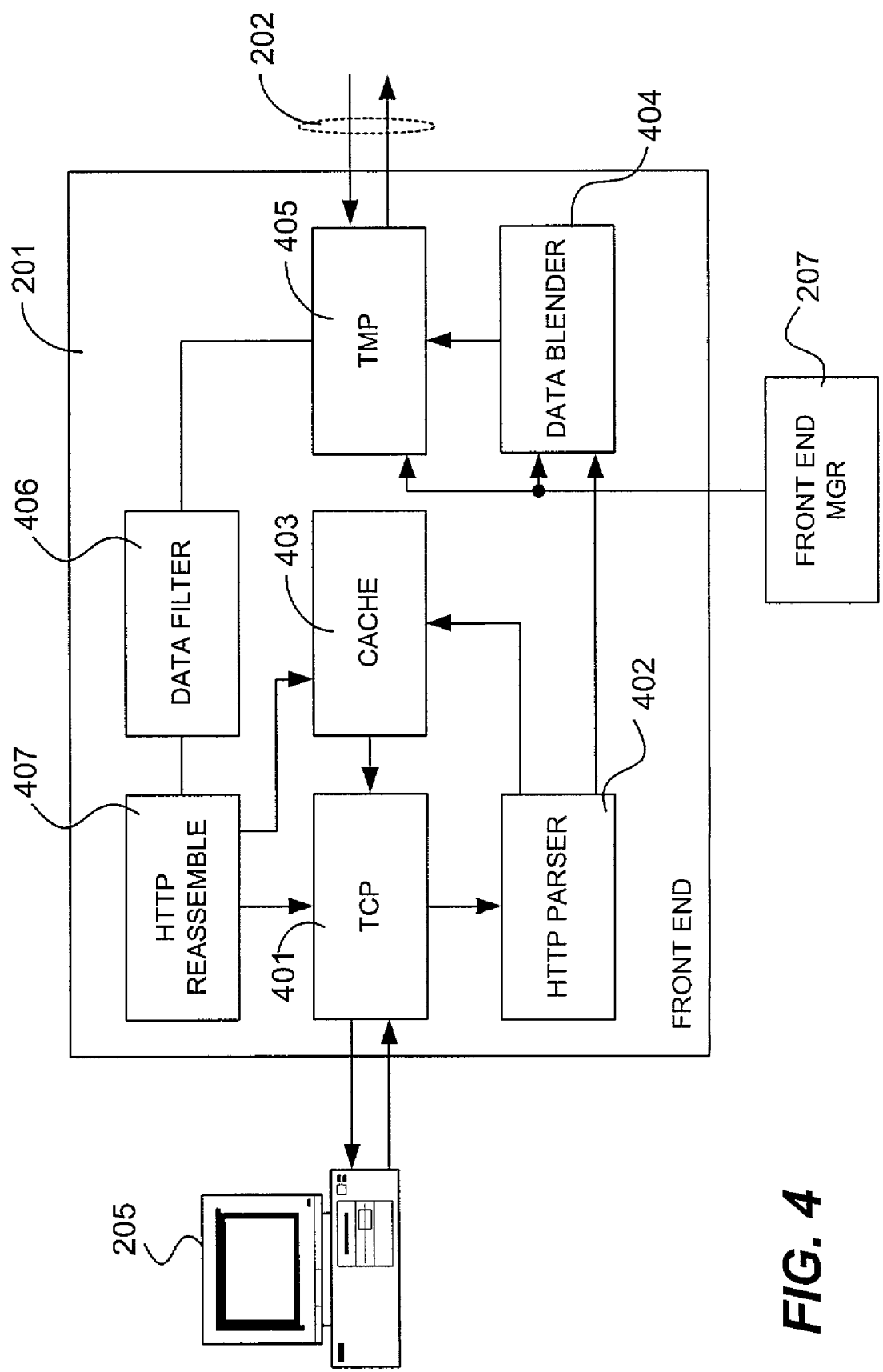
FIG. 4 shows front-end server components of FIG. 2 in greater detail.

FIG. 4 illustrates principle functional components of an exemplary front-end 201 in greater detail. Primary functions of the front-end 201 include providing services on its own behalf and/or on behalf of a network server, and translating transmission control protocol (TCP) packets from client 205 into transport morphing protocol™ (TMP™) packets used in the system in accordance with the present invention. Transport morphing protocol and TMP are trademarks or registered trademarks of Circadence Corporation in the United States and other countries. It is contemplated that the various functions described in reference to the specific examples may be implemented using a variety of data structures and programs operating at any location in a distributed network. For example, a front-end 201 may be operated on a network appliance 107 or server within a particular network 102, 103, or 104 shown in FIG. 1. The present invention is readily adapted to any application where multiple clients are coupling to a centralized resource. Moreover, other transport protocols may be used, including proprietary transport protocols.

TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein. Where protocols other than TCP/IP are used to couple to a client 205, TCP component 401 is replaced or augmented with an appropriate network protocol process.

TCP component 401 communicates TCP packets with one or more clients 205. Received packets are coupled to parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 402 analyzes the payload portion of the TCP packet. In the examples herein, HTTP is employed as the user-level protocol because of its widespread use and the advantage that currently available browser software is able to readily use the HTTP protocol. In this case, parser 402 comprises an HTTP parser. More generally, parser 402 can be implemented as any parser-type logic implemented in hardware or software for interpreting the contents of the payload portion. Parser 402 may implement file transfer protocol (FTP), mail protocols such as simple mail transport protocol (SMTP) and the like. Any user-level protocol, including proprietary protocols, may be implemented within the present invention using appropriate modification of parser 402.

To improve performance, front-end 201 optionally includes a caching mechanism 403. Cache 403 may be implemented as a passive cache that stores frequently and/or recently accessed web pages or as an active cache that stores network resources that are anticipated to be accessed. In non-web applications, cache 403 may be used to store any form of data representing database contents, files, program code, and other information. Upon receipt of a TCP packet, HTTP parser 402 determines if the packet is making a request for data within cache 403. If the request can be satisfied from cache 403 the data is supplied directly without reference to web server 210 (i.e., a cache hit). Cache 403 implements any of a range of management functions for maintaining fresh content. For example, cache 403 may invalidate portions of the cached content after an expiration period specified with the cached data or by web sever 210. Also, cache 403 may proactively update the cache contents even before a request is received for particularly important or frequently used data from web server 210. Cache 403 evicts information using any desired algorithm such as least recently used, least frequently used, first in/first out, or random eviction. When the requested data is not within cache 403, a request is processed to web server 210, and the returned data may be stored in cache 403.

Several types of packets will cause parser 404 to forward a request towards web server 210. For example, a request for data that is not within cache 403 (or if optional cache 403 is not implemented) will require a reference to web server 210. Some packets will comprise data that must be supplied to web server 210 (e.g., customer credit information, form data and the like). In these instances, HTTP parser 402 couples to data blender 404.

Optionally, front-end 201 implements security processes, compression processes, encryption processes and the like to condition the received data for improved transport performance and/or provide additional functionality. These processes may be implemented within any of the functional components (e.g., data blender 404) or implemented as separate functional components within front-end 201. Also, front-end 201 may implement a prioritization process to identify packets that should be given higher priority service. A prioritization program requires that front-end 201 include a data structure associating particular clients 205 or particular TCP packet types or contents with a prioritization information. Computation and management of the priority information, discussed hereinbelow in greater detail, is a significant feature of the present invention.

Blender 404 slices and/or coalesces the data portions of the received packets into a more desirable "TMP units" that are sized for transport through the TMP mechanism 202. The data portion of TCP packets may range in size depending on client 205 and any intervening links coupling client 205 to TCP component 401. Moreover, where compression is applied, the compressed data will vary in size depending on the compressibility of the data. Data blender 404 receives information from front-end manager 207 that enables selection of a preferable TMP packet size. Alternatively, a fixed TMP packet size can be set that yields desirable performance across TMP mechanism 202. Data blender 404 also marks the TMP units so that they can be re-assembled at the receiving end.

Data blender 404 also serves as a buffer for storing packets from all clients 205 that are associated with front-end 201. Blender 404 mixes data packets coming into front-end 201 into a cohesive stream of TMP packets sent to back-end 203 over TMP link 202. In creating a TMP packet, blender 404 is able to pick and choose amongst the available packets according to priority information associated with the packets so as to prioritize some packets over others.

In an exemplary implementation, a "TMP connection" comprises a plurality of "TCP connection buffers", logically arranged in multiple "rings". Each TCP socket maintained between the front-end 201 and a client 205 corresponds to a TCP connection buffer. When a TCP connection buffer is created it is assigned a priority. For purposes of the present invention, any algorithm or criteria may be used to assign a priority. Each priority ring is associated with a number of TCP connection buffers having similar priority. In a specific example, five priority levels are defined corresponding to five priority rings. Each priority ring is characterized by the number of connection buffers it holds (nSockets), the number of connection buffers it holds that have data waiting to be sent (nReady) and the total number of bytes of data in all the connection buffers that it holds (nBytes).

When composing TMP data packets, the blender goes into a loop comprising the steps:

1) Determine the number of bytes available to be sent from each ring (nBytes), and the number of TCP connections that are ready to send (nReady)

2) Determine how many bytes should be sent from each ring. This is based on a weight parameter for each priority. The weight can be thought of as the number of bytes that should be sent at each priority this time through the loop.

3) The nSend value computed in the previous step reflects the weighted proportion that each ring will have in a blended TMP packet, but the values of nSend do not reflect how many bytes need to be selected to actually empty most or all of the data waiting to be sent a single round. To do this, the nSend value is normalized to the ring having the most data waiting (e.g., nBytes=nSendNorm). This involves a calculation of a factor: S=nBytes/(Weight*nReady) for the ring with the greatest nReady. Then, for each ring, calculate nReady*S*Weight to get the normalized value (nSendNorm) for each priority ring.

4) Send sub-packets from the different rings. This is done by taking a sub-packet from the highest priority ring and adding it to a TMP packet, then adding a sub-packet from each of the top two queues, then the top three, and so on.

5) Within each ring, sub-packets are added round robin. When a sub-packet is added from a TCP connection buffer the ring is rotated so the next sub-packet the ring adds will come from a different TCP connection buffer. Each sub-packet can be up to 512 bytes in a particular example. If the TCP connection buffer has less than 512 bytes waiting, the data available is added to the TMP packet.

6) When a full TMP packet (roughly 1.5 kE in a particular example) is built, it is sent. This can have three or more sub packets, depending on their size. The TMP packet will also be sent when there is no more data ready.

Figure 5:
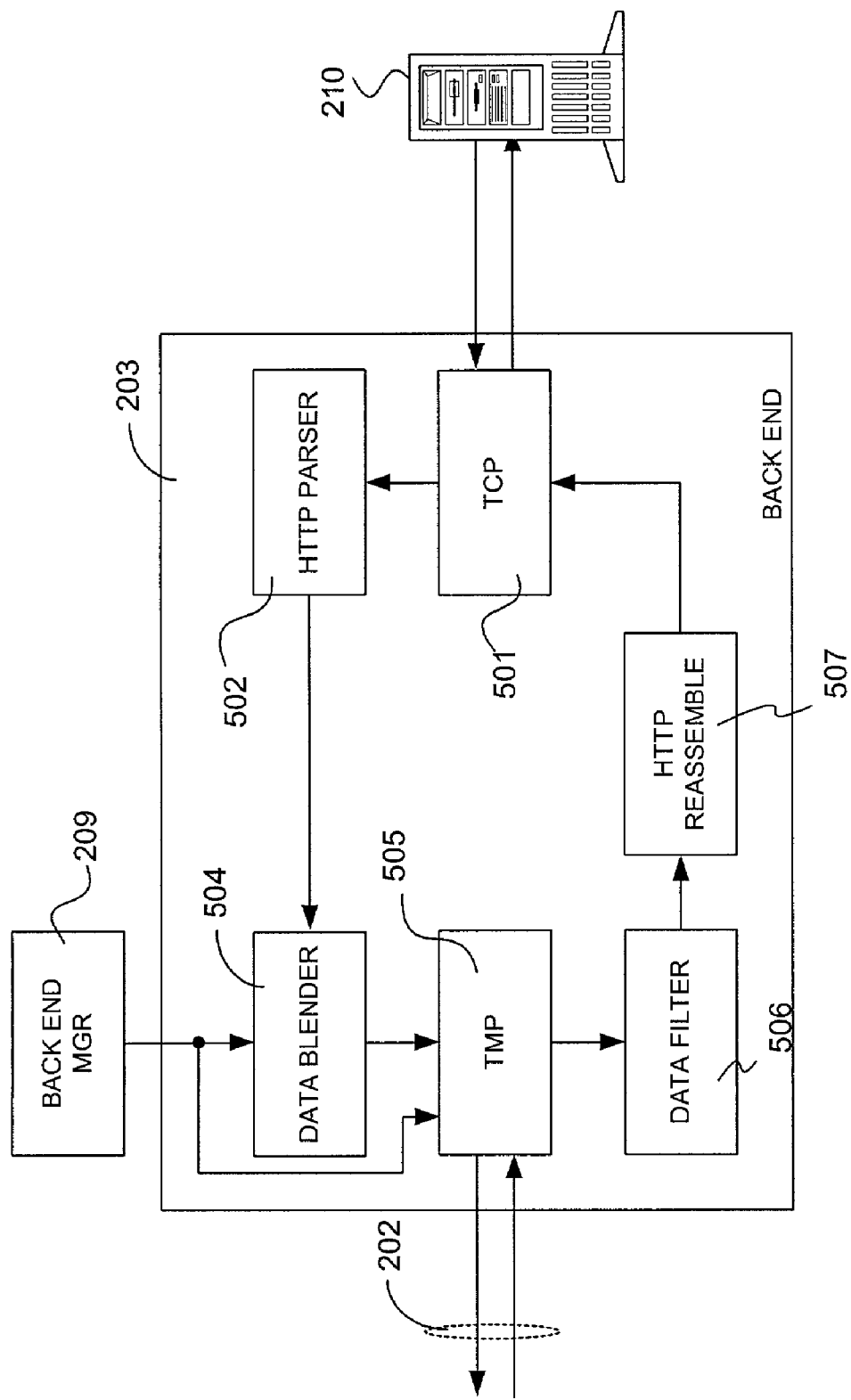
FIG. 5 shows back-end server components of FIG. 2 in greater detail.

TMP mechanism 405 implements the TMP protocol in accordance with the present invention. TMP is a TCP-like protocol adapted to improve performance for multiple channels operating over a single connection. Front-end TMP mechanism 405 and corresponding back-end TMP mechanism 505 shown in FIG. 5 are computer processes that implement the end points of TMP link 202. The TMP mechanism in accordance with the present invention creates and maintains a stable connection between two processes for high-speed, reliable, adaptable communication.

TMP is not merely a substitute for the standard TCP environment. TMP is designed to perform particularly well in environments such as the Internet. TMP connections are made less often than TCP connections. Once a TMP connection is made, it remains up unless there is some kind of direct intervention by an administrator or there is some form of connection breaking network error. This reduces overhead associated with setting up, maintaining and tearing down connections normally associated with TCP.

Another feature of TMP is its ability to channel numerous TCP connections through a single TMP pipe 202. The environment in which TMP resides allows multiple TCP connections to occur at one end of the system. These TCP connections are then mapped into a single TMP connection. The TMP connection is then broken down at the other end of the TMP pipe 202 in order to traffic the TCP connections to their appropriate destinations. TMP includes mechanisms to ensure that each TMP connection gets enough of the available bandwidth to accommodate the multiple TCP connections that it is carrying.

TMP is not merely a substitute for the standard TCP environment. TMP is designed to perform particularly well in heterogeneous network environments such as the Internet. TMP connections are made less often than TCP connections. Once a TMP connection is made, it remains up unless there is some kind of direct intervention by an administrator or there is some form of connection breaking network error. This reduces overhead associated with setting up, maintaining and tearing down connections normally associated with TCP.

Another advantage of TMP as compared to traditional protocols is the amount of information about the quality of the connection that a TMP connection conveys from one end to the other of a TMP pipe 202. As often happens in a network environment, each end has a great deal of information about the characteristics of the connection in one direction, but not the other. By knowing about the connection as a whole, TMP can better take advantage of the available bandwidth.

In contrast with conventional TCP mechanisms, the behavior implemented by TMP mechanism 405 is constantly changing. Because TMP obtains bandwidth to host a variable number of TCP connections and because TMP is responsive information about the variable status of the network, the behavior of TMP is preferably continuously variable. One of the primary functions of TMP is being able to act as a conduit for multiple TCP connections. As such, a single TMP connection cannot behave in the same manner as a single TCP connection. For example, imagine that a TMP connection is carrying 100 TCP connections. At this time, it loses one packet (from any one of the TCP connections) and quickly cuts its window size in half (as specified for TCP). This is a performance reduction on 100 connections instead of just on the one that lost the packet.

Each TCP connection that is passed through the TMP connection must get a fair share of the bandwidth, and should not be easily squeezed out. To allow this to happen, every TMP becomes more aggressive in claiming bandwidth as it accelerates. TMP also ensures that it becomes more and more resistant to backing off with each new TCP connection that it hosts. A TMP connection that is hosting more than one TCP connection should not go down to a window size of one.

In a particular implementation, every time a TCP connection is added to (or removed from) what is being passed through the TMP connection, the TMP connection behavior is altered. It is this adaptation that ensures successful connections using TMP. Through the use of the adaptive algorithms discussed above, TMP is able to adapt the amount of bandwidth that it uses. When a new TCP connection is added to the TMP connection, the TMP connection becomes more aggressive. When a TCP connection is removed from the TMP connection, the TMP connection becomes less aggressive.

TMP pipe 202 provides improved performance in its environment as compared to conventional TCP channels, but it is recognized that TMP pipe 202 resides on the open, shared Internet in the preferred implementations. Hence, TMP must live together with many protocols and share the pipe efficiently in order to allow the other transport mechanisms fair access to the shared communication bandwidth. Since TMP takes only the amount of bandwidth that is appropriate for the number of TCP connections that it is hosting (and since it monitors the connection and controls the number of packets that it puts on the line), TMP will exist cooperatively with TCP traffic. Furthermore, since TMP does a better job at connection monitoring than TCP, TMP ends up surpassing TCP in regards to this requirement.

Also shown in FIG. 4 are data filter component 406 and HTTP reassemble component 407 that process incoming (with respect to client 205) data. TMP mechanism 405 receives TMP packets from TMP pipe 202 and extracts the TMP data units. Using the appended sequencing information, the extracted data units are reassembled into HTTP data packet information by HTTP reassembler 407. Data filter component 406 may also implement data decompression where appropriate, decryption, and handle caching when the returning data is of a cacheable type.

FIG. 5 illustrates principle functional components of an exemplary back-end 203 in greater detail. Primary functions of the back-end 203 include translating transmission control protocol (TCP) packets from web server 210 into TMP packets as well as translating TMP packets into the one or more corresponding TCP packets generated by clients 205. TMP unit 505 receives TMP packets from TMP pipe 202 and passes them to HTTP reassemble unit 507 where they are reassembled into the corresponding TCP packets. Data filter 506 may implement other functionality such as decompression, decryption, and the like to meet the needs of a particular application. The reassembled data is forwarded to TCP component 501 for communication with web server 210.

TCP data generated by the web server process are transmitted to TCP component 501 and forwarded to HTTP parse mechanism 502. Parser 502 operates in a manner analogous to parser 402 shown in FIG. 4 to extract the data portion from the received TCP packets, perform optional compression, encryption and the like, and forward those packets to data blender 504. Data blender 504 operates in a manner akin to data blender 404 shown in FIG. 3 to buffer and prioritize packets in a manner that is efficient for TMP transfer. Priority information is received by, for example, back-end manager 209 based upon criteria established by the web site owner. TMP data is streamed into TMP unit 505 for communication on TMP pipe 202. Priority information used by back-end 203 need not be but may be identical to the priority information used by an associated front-end 201.

Figure 6:
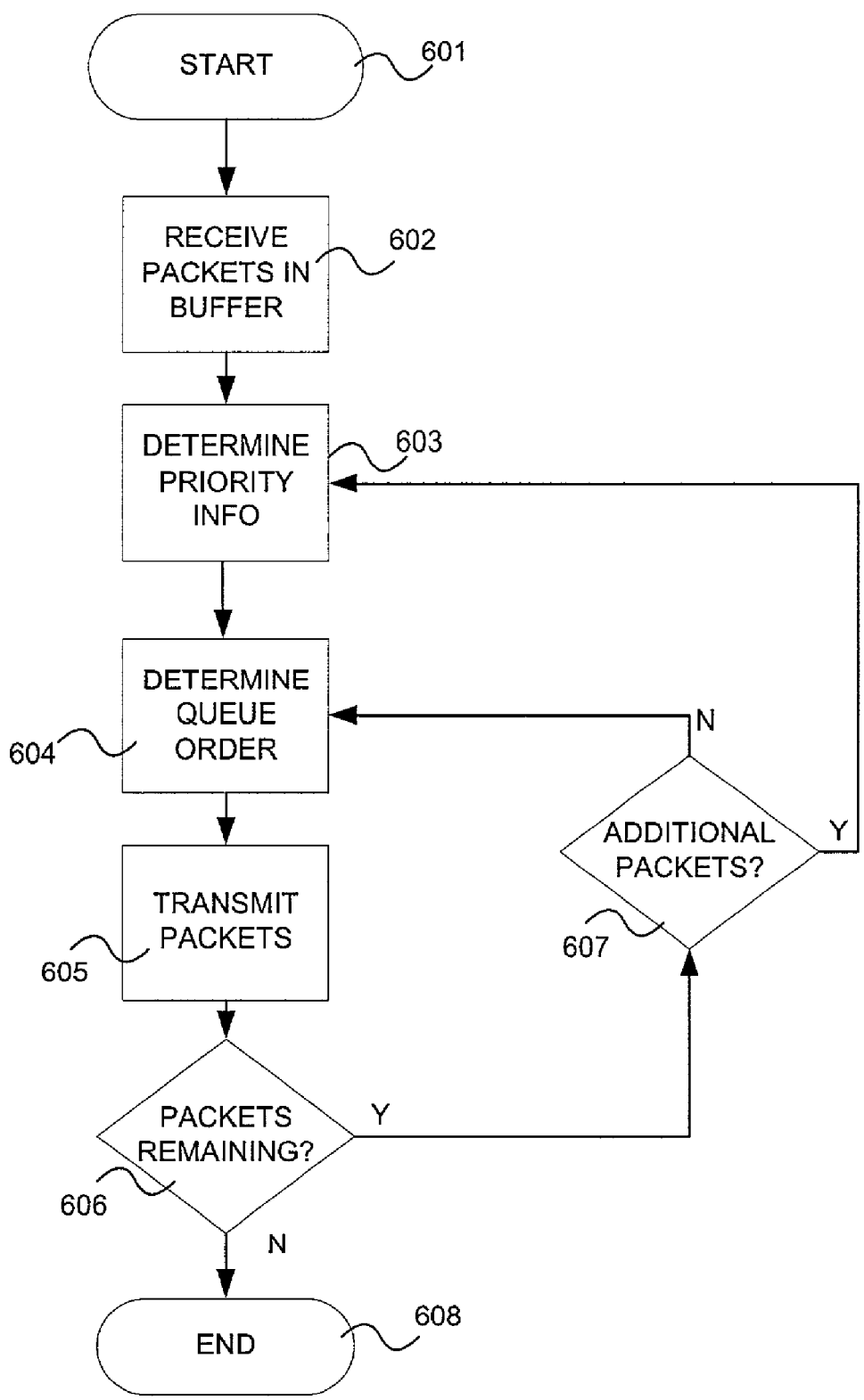
FIG. 6 shows a high-level flow chart representation of an information prioritization function.

FIG. 6 is a high-level flow chart representation describing actions undertaken in a packet prioritization function in accordance with the present invention. As noted hereinbefore, the actions illustrated in FIG. 6 may take place at any intermediary computing device between a client 205 and a server 210, however, for ease of description the prioritization process will be described in terms of processes undertaken at a front-end 201. The prioritization function is initialized at 601 and front-end receives one or more unprioritized client data packets at 602. At step 603, priority information is obtained and an effective priority value is determined from the priority information. Queue order is then determined at step 604. Packets are transmitted at step 605. At step 606, the system determines whether there are packets remaining in buffer. If packets remain in the buffer, the system determines whether additional incoming packets are received at step 607. If additional packets are received, the system proceeds to step 603. If additional packets are not received, the system proceeds to step 604. If there are no packets remaining in the buffer at step 606, the system proceeds to step 608 and the function is terminated.

In one embodiment, the function starts at 601 each time a connection is established between clients 205 and web server 210, wherein at least one network computer 201, 203 serves as an intermediary web server. Client 205, web server 210, and the at least one network computer 201 and/or 203 comprise a network for purposes of this disclosure. At step 602, an intermediary web server receives at least one set of information. A set of information may comprise a packet, a connection between a client and a server, a combination thereof, or other information that is transmitted between two network devices. Each set of information may contain priority information. Priority information comprises priority values, priority parameters, as well as information for translating a priority parameter to a priority value. Priority information may also include weighting algorithms used to combine multiple priority values into an effective priority value that determines transmission order across TMP link 202.

In one embodiment, priority parameter and priority values are received at step 602. For example, an intermediary may receive a packet that includes one or more priority parameters and/or one or more priority values. A priority parameter is an attribute associated with a set of information, such as an attribute associated with a network device that requested the set of information, an attribute associated with a network device that transmitted the set of information, or other attributes. Priority parameters are communicated between network devices as part of a data packet using type:value pairs, for example. Alternatively, priority parameters may be communicated based on a predetermined type:value scheme, such as transmitting a first priority parameter in a specified location of a packet and a second priority parameter in a second location of the packet.

The type:value scheme may be updated by an administrator from time-to-time and/or dynamically generated based on network conditions. Additionally, priority parameters may be determined based on the set of information that is being transmitted across the network. For example, a URL for a requested web page may be parsed to identify a portion of the URL used as a priority parameter for the request. A request may be associated with one or multiple priority parameters.

A priority value comprises, for example, a numeric or arithmetic value that establishes a priority for a set of information based on a priority parameter. A priority value distinguishes between different priorities based on a prioritization scheme, such as a priority scheme allowing integer values from 1–10 or for a Boolean type prioritization scheme allowing values of 0 or 1. A priority parameter is associated with a priority value based on mapping information. Priority valuation information may be stored in one or more data stores and serves to associate each priority parameter to a priority value. For example, if a priority parameter for a web site priority parameter type is www.vr-1.com (e.g., webSiteID=www.vr1.com), this priority parameter is mapped to a priority value, such as "high" or 10. The mapping from a priority parameter to a priority value is implemented at step 603 in FIG. 6.

The parameter valuation information may be statically defined, but is preferably dynamically alterable by the front-end manager 207, back-end manager 209, and/or the owner/operator of a web site 210. The entities that are permitted to modify the priority valuation information as well as any rules controlling such modification are to be determined on a case-by-case basis to meet the needs of a particular application. For example, the valuation given to parameters associated with content priority should be alterable by the site owner associated with the content as would site-specified user priority parameters. In contrast, the priority value associated with a global priority parameter that is relevant across multiple domains may be controlled only by logic within front-end 201 and/or front-end manager 207, for example.

Priority information is preferably transmitted with the set of information in the form of one or more parameters appended to the set of information. This is akin to the manner in which cookies are transmitted with an HTTP request packet as a parameter appended to the URL. Alternatively or in addition, some types of priority information may be transmitted on a separate out-of-band management system channel, or by a combination thereof. In one embodiment, priority values and priority parameters are transmitted with the set of information while priority valuation information and weighting algorithms are transmitted via the out-of-band management system channel.

Priority information may be stored on an intermediary computer such as front-end 201 and back-end 203, on web server 210, on clients 205, on other network devices, or a combination thereof. For example, clients 205 may contain cookies provided by an intermediary and/or web server 210 that identify one or more priority parameters associated with each of the clients 205. Additionally, once a priority parameter is mapped to a priority value, the relationship between the priority parameter and the priority value may be maintained by the intermediary computer for a predetermined amount of time and/or until a predetermined event. For example, once a priority value associated with a user identification priority parameter is determined to be "1" by an intermediary computer, the intermediary computer may store this information until a connection with a client identified as by that priority parameter is closed.

One embodiment of the present invention selectively prioritizes sets of information based on the priority parameters associated with each of the following priority parameter types: user identification, session identification, content identification, specific content elements, parsed data in the stream, rules specified by the content provider, rules specified by a user, soft landing, requested information volatility, and type of connection established. A client, a content provider or other entity may specify the priority parameter information and the priority valuation information used for the specified priority parameters.

User identification priority information provides information that is used to determine a user-specific priority value. For example, a user identification associated with a set of information, such as a packet or a connection, may provide a priority value directly. For example, a user identification value may identify a user as a high or low priority user or a priority based on another priority range such as one to ten. Alternatively, the set of information may include information that is used by the system to determine a user identification priority value. For example, the set of information may identify a user associated with the set of information, such as by user name, user account number, IP address or other information. This user identification value must be mapped by the system to a priority value. In this way, a set of information having a user identification value of "Fred Smith" may be translated into a user identification priority value, such as "high" or "10."

Optionally, the system may allow user to gain high or higher priority status by paying for preferential treatment, such as by paying an extra fee to an ISP. Additionally, the user may acquire preferential treatment by conducting multiple purchases or other transactions online. Other criteria for conferring prioritized treatment based on user identification may also be used. Similarly, high priority status may be conferred to a user based on a number of a certain type of connection a user creates, such as the number of secure connections created by the user.

Session identification priority information identifies a session that warrants preferential treatment. For example, if a session has completed two online transactions, the system may want to encourage further transactions by providing high priority to packets associated with the session. In this way, bandwidth may be effectively shifted from sessions that are not generating revenue to sessions that are generating revenue.

Content identification priority information relates to the data that is being transmitted. A content parameter may comprise a file location or branch within a directory structure as indicated in a URL. Alternatively, a content parameter may comprise data within a packet itself such as a packet containing an advertisement or company logo that the site owner wishes to be transmitted with a high degree of reliability. For example, if a packet relates to the completion of an online sale, a content identification priority parameter may be set to indicate high priority (e.g., 10) or may be set to indicate "sale."

Specific content element priority information may be used to identify particular types of content that warrant high priority. For example, if a merchant wants to have banner ads appear on a web page first, packets containing banner ads may have a high priority. Of course, banner ads could be explicitly given a lower priority as well. Additionally, if a user wants to receive video content only after all non-video content is received, video files may receive a low priority. Some form of arbitration may be implemented by the system to determine which packets receive highest priority when a user and a content provider have different prioritization schemes. For example, if a user wants banner ads to appear last and audio files to appear first, the system may determine which entity, user or content provider, is more valuable to the system or use other criteria in determining how to prioritize packets transmitted to the client.

Parsed data element priority information includes any data element in the packet body that has been assigned a priority determining nature. For example, if the packet is an XML document, parser 402 may parse the content of the packet to determine a document type definition (DTD) and read one or more tags in the packet. The DTD may establish the type of content that is to be given highest priority. For example, with a music-related DTD, audio content may be given a high priority, whereas with an e-commerce related DTD, audio files may be given a low priority. The content provider may override the default DTD-based prioritization values.

Parsed URL priority information comprises priority information associated with a URL itself. For example, a request for a document from a /sale directory may be given a higher category than a request for a document from an /AboutUs directory. HTTP packets as identified in the protocol field of the URL may given higher/lower priority than FTP packets. The web site administrator may change the priority scheme associated with various web site directories or web site documents from time to time. Modifications to a priority scheme may be communicated to one or more back-end server computers or other network device by an out-of-band management system.

Soft Landing™ priority information identifies the likelihood or possibility that a soft landing will satisfy a request for information from a web site. Soft Landing is a trademark of Circadence Corporation in the United States and other countries. The term "soft landing" as used herein refers to a brand services provided in substitution for requested services when the requested services cannot be timely provided. For example, there is a relatively high likelihood that a user who makes a request for a home page of a physical store's web site will be satisfied to receive a soft landing that provides a predetermined set of information, such as location, hours of operation, a phone number, and perhaps a coupon redeemable for discounted services when the requested service becomes available. On the other hand, there is a relatively low likelihood that a user who makes a request for flight information will be satisfied to receive a soft landing that provides alternative information.

Volatility priority information identifies the time-sensitivity associated with requested information. Highly volatile information may have a higher priority value than non-volatile information. For example, a user requesting stock information is likely to be dissatisfied if the requested information does not arrive quickly because the volatility of stock market information is extreme. On the other hand, a user requesting information from a real estate web site may not notice a small delay in obtaining requested information, because there is a lower degree of volatility associated with real estate information. Accordingly, a requested information volatility priority parameter for a stock information request will be greater than a requested information volatility priority parameter for a real estate information request.

User-specified preference priority information identifies a user-specific priority scheme. For example, a first user may want to experience the multimedia aspect of web pages, and establish a priority scheme that attempts to bring all content associated with a web page to the user as quick as possible. A second user may want to access text information as quickly as possible, and establish a priority scheme that increases the priority associated with text and decreases the priority associated with all other types of media. Other priority parameter types may be used in accordance with user settings, website administrator settings, network administrator settings, or other settings.

While the above description identifies particular kinds and uses of priority information, the exemplary web-based implementation uses four types of parameter information: content priority information, site-specified user priority information, domain-specific user priority information, and global user priority information.

The content priority information is the priority value placed on the web site content as determined by a web site administrator. Content priority has named values from 0 to 4:

Low (0)

Basic (1)

Facilitated (2)

Expedited (3)

Urgent (4)

Secure transactions default to the content priority level set by the administrator. In practice, a map of the site is transmitted to the back-end 203 supporting a particular web site and a content priority value is associated with each page of content. If a page does not have a content priority explicitly assigned, the priority of the page in the HTTP referred-by field can be used.

Site-specified user priority information (SSUP) is a means by which the web site 210 can insert tags into the generation of dynamic pages, to allow user requests to be given a priority based on some information that web site 210 has about the user making a request. In a particular example, SSUP will have values 0–4. The SSUP is communicated to a back-end 203 by a parameter encoded in the HTML header. This parameter is encoded as:

<!CrcdncPri=x> where "x" can be a number form 0–4.

A domain user priority aggregates priority information over a plurality of web sites 210. In contrast to the site-specified user priority, the domain priority is derived from the content priorities of a plurality of web pages. More generally, the domain priority information is used to aggregate priority of a variety of like-kind or dissimilar services that are requested by a particular user. The aggregation may be made over multiple domains, as described above, or multiple visits to a single domain in a similar manner. In a particular embodiment, the content priority value for each web page that is requested is converted to a "page credit". This process allows higher priority pages to have a stronger influence on the effective priority computed later. The conversion to page credits can be performed with a simple look-up table shown in Table 1:

TABLE 1

| Content Priority | Credits per page viewed |
|---|---|
| 0 | 0 |
| 1 | 1 |
| 2 | 2 |
| 3 | 5 |
| 4 | 20 |

Each time a page with a content priority of 4 is viewed, a credit of 20 is added, for example, to the domain user priority value. The credit per page viewed may be altered to affect the desired influence on the effective priority value. In this manner, the domain user priority information can be used to identify a user that views many high-priority pages on a number of web sites 210 (e.g., a frequent purchaser) even if the particular user has never visited a particular site 210.

In accordance with the present invention, the priority values are exchanged between entities in the form of parameters. Each entity (i.e., clients 205, front-end 201, back-end 203, managers 207 and 209, and server 210) are uniquely situated to gather data, perform calculations, and store the various priority information. Particularly in web-based applications, there is no readily available mechanism for exchanging this state information between entities. In accordance with the present invention, the priority information is exchanged as parameters appended to the message body portion of HTTP packets. More generally, priority information can be appended to any packet or URL scheme that supports passing arbitrary parameters within the payload portion.

HTTP packets may carry other parameters that are unrelated to the prioritization system of the present invention. The preferred implementations use rules to help distinguish parameters that pass prioritization information from other parameters:

1) The priority parameters are always put at the end of the packet.
2) The beginning of the priority parameters is indicated by a "?". This means that either all of the data after the last "?" are priority parameter.
3) Each priority parameter will begin with a delimiter character (e.g., "*"). This makes parsing easier, since the parameters are always in the format "?*aaa*bbb".
4) Priority parameters are of a specific form and length, and always have at least one checksum.

As long as no other parameters begin with a "?" and have a similar length and form, it is possible to distinguish prioritization parameters from non-prioritization parameters.

Returning to FIG. 6, at step 603, the system determines priority information from incoming packets. In the particular examples, the domain-specific user priority information is stored in a cookie on client 205 which will be transferred in the HTTP request packet. When a web page is sent to client 205, the domain cookie is updated with a new priority value indicating the accumulated page credits. In one embodiment, an intermediary (e.g., front-end 201 and/or back-end 203) determines priority information for a received set of information, such as a packet. As between a client 205 and a front-end 201, for example, conventional cookie exchange mechanisms can be used to exchange priority information because the client 205 believes that the assigned front-end 201 is in the domain of the origin server to which the request is ultimately directed.

The priority value is determined from a priority parameter using priority valuation information. For example, an intermediary computer, such as back-end 203, may receive a priority parameter that identifies a type of content that is contained in a packet, such as a banner advertisement. The intermediary may contain mapping information that allows the intermediary to determine a priority value associated with the priority parameter. For example, the intermediary may contain a table that maps each priority parameter to a priority value. In this way, the intermediary may determine a content type priority value associated banner advertisement content. Alternatively, the intermediary may request priority valuation information from another intermediary or another network device. In a preferred embodiment, the packet may be assigned a default priority value until a rationally based priority value is determined by the system.

Once a priority parameter is mapped to a priority value, the priority value may be maintained at one or more computers associated with a network connection. For example, the priority value associated with a user identification may be stored as part of a cookie on the client and/or stored in a data store of an intermediary. Additionally, priority values may be appended to a set of information, such as by appending a value to a packet header in a predetermined location or placing a type:value pair in a packet body.

Two or more priority values may be used to determine at least one effective priority value. The intermediary may implement a weighting function between two or more priority values based upon one or more weighting algorithms. For example, a request packet is associated with a site-specified user priority (SSUP), a domain user priority (DUP), and a content priority (CP). The three priority values are combined using a weighting algorithm:

$$EP = \frac{A*DUP + B*SSUP + C*CP}{A + B + C}$$

where
EP=Effective Priority;
DUP=Domain User Priority;
SSUP=Site Specified User Priority; and
CP=Content Priority.

A, B, and C are weights that determine the influence of each of the three priority values respectively on the final Effective Priority. These constant values are dynamically configurable.

Other weighting algorithms, including linear and non-linear algorithms, may be used. Weighting algorithms may be communicated between network devices via the out-of-band management system, as part or all of a data packet, or by other available techniques. In this manner, an effective priority value may be determined based on the priority values associated with a user identification and a requested web site. Each of the components of the aggregate value may be given the same or different weights. For example, the priority value associated with the user identification may be twice as important as the priority value associated with the requested web site in determining an aggregate priority value (e.g., A=B=2, C=1 in the formula above). The weights of each of the components of the aggregate priority value may be determined by a system administrator, a content provider, a user, a combination of the aforementioned, or by other criteria.

Sets of information are transmitted across and within the network in accordance with at least one priority value (e.g., the effective priority) at step 604. Alternatively, the priority value may be transferred by reference (e.g., the set of information includes a pointer or reference to a data structure holding the priority value). For example, packets having a high priority may be transmitted before packets having a low priority. If a range of priority values is available, packets having the highest priority value may be transmitted each transmission cycle. If all packets having a particular priority value cannot be transmitted during a particular transmission cycle, packets that have been within the network for the longest amount of time may be transmitted prior to packets having similar priority values that have not been in the network as long.

Any sets of information that cannot be transmitted during step 604 may be maintained at the appropriate network device and the function may be repeated. In one embodiment, the number of transmission cycles that a set of information remains in the network influences a time-based priority value associated with the set of information. For example, a packet initially having a low priority that remains in a buffer for a predetermined number of cycles may be transmitted from the buffer instead of another high priority packet that has just arrived in the buffer.

In one embodiment, the amount of bandwidth available to a network device is dependant upon the priority of the sets of information associated with the network device. For example, if two front-ends 201 are receiving similar quantities of information from one or more clients 205 and one or more back-end servers 203, but a first front-end 201 is receiving and transmitting higher priority sets of information than a second front-end server 201, the first front-end may be allocated more network bandwidth than the second front-end server. Similarly, the first front-end server may back-off more slowly in response to network congestion and be more aggressive about reclaiming bandwidth than the second front-end server. An out-of-band management system may ensure that the front-end server computers are, in aggregate, complying with any sharing protocols required by the network. Similarly, when a back-end 203 is heavily loaded, the second front-end 201 may be directed to reduce transmissions to the loaded back-end 203 to ensure that higher priority traffic from the first front-end 201 is not dropped in favor of lower priority traffic from the second front-end 201.

Figure 7:
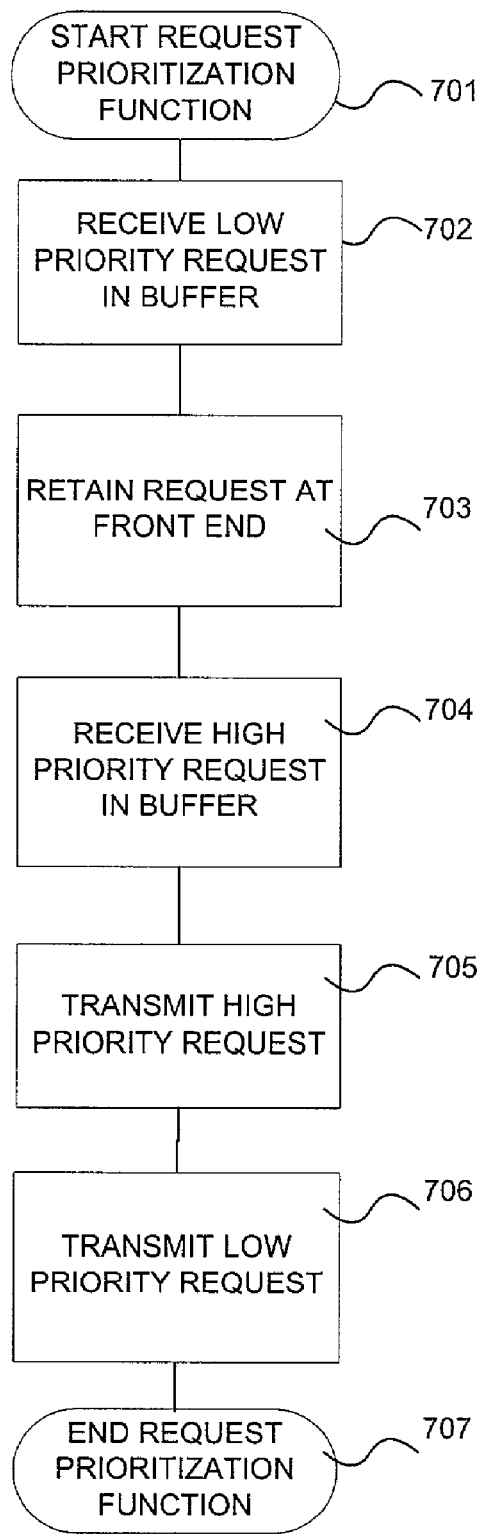
FIG. 7 shows a detailed flow chart representing an exemplary request prioritization function.

FIG. 7 shows a detailed flow chart representing an exemplary request prioritization function. This example shows how the present system distinguishes between a high priority request and a low priority request awaiting transmission in a buffer queue. At step 702, a network device, such as a front-end server, receives a low priority request. This low priority request may be the result of a default setting on the intermediary which defaults a received request to a low priority setting unless the intermediary receives priority information that dictates the request should receive high priority status. Additionally, the request may be identified as a low priority request by the client making the request.

At step 703, the low priority request is retained in a buffer of the front-end. The low priority request may be maintained at an intermediary due to the presence of a number of higher priority packets at the intermediary. Additionally, the intermediary to which the low priority packet was sent may be unauthorized to transmit packets due to communications sent by an out-of-band management system. Other factors may cause the intermediary to retain the low priority request.

At step 704, the system may receive a high priority request. For example, an intermediary may receive a high priority request and place it in the buffer with the low priority request. At step 705, the high priority request is transmitted prior to the low priority request, even though the low priority request was received by the front-end server prior to the high priority request. At step 706, the low priority request is transmitted. In one embodiment, a low priority request becomes a high priority request after a predetermined time. In another embodiment, a low priority request is dismissed from the buffer after a predetermined amount of time. At step 707, the request prioritization function terminates.

Figure 8:
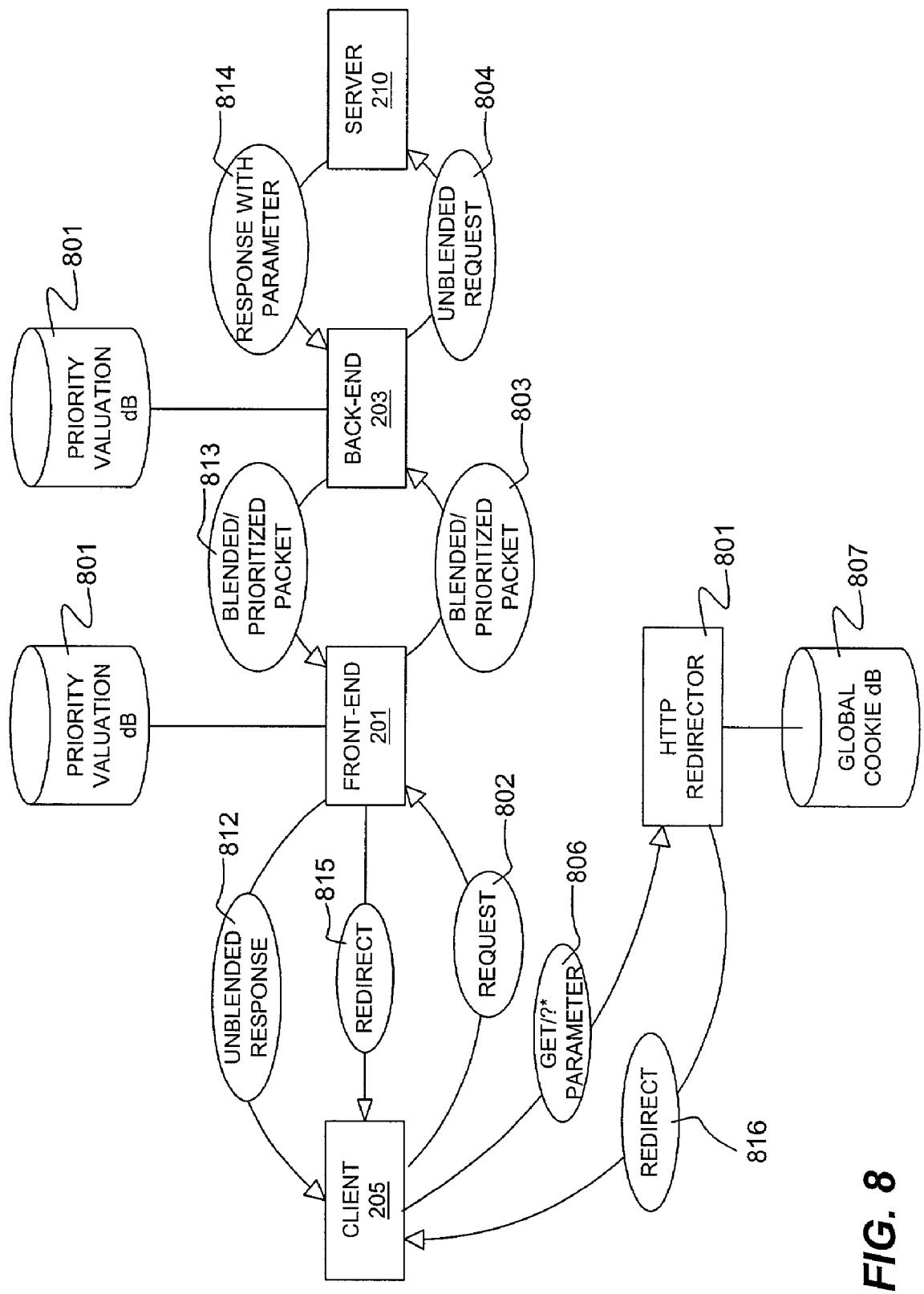
FIG. 8 illustrates relationships and data exchanges between various entities in accordance with the present invention.

FIG. 8 illustrates entities and relationships established during a web-based interaction in accordance with the present invention. In the example of FIG. 8, the user of client 205 desires to connect to the URL "http://www.a.com/index.html?1234". In this example, "www.a.com" is the web server, "index.html" is the specific web page, and "1234" is an additional parameter that is being passed to the index.html page.

The user types a URL, or selects a link to a URL, in a web browser operating on client 205. The URL of the destination web server customer will be redirected, via the DNS redirector system described in reference to FIG. 3, to a front-end 201. Client 205 does a DNS lookup on "www.a.com". This lookup results in the identification of an appropriate front-end 201. The numerical IP address of the selected front-end 201 is returned to client 205. In response, client 205 will recognize the returned IP address as the location of the "www.a.com" domain and send the request (e.g., GET index.html?1234 HTTP/1.1) to the returned IP address. This GET request may include a host parameter "Host: www.a.com" provided by redirector 309 that identifies a particular destination web server 201. The front-end 201 will receive the HTTP request and extract the destination hostname from the HTTP 'Host:' parameter in the client request so it knows to which back-end 203 and ultimately which destination Web Server 210 the client 205 desires to reach.

Front-end 201 checks for the presence of cookies in the HTTP request, and in particular checks for the presence of a "domain cookie" that includes the domain user priority information. When a domain cookie is present, the request includes:

GET index.html?1234 HTTP/1.1
Host:www.a.com
Cookies: Id: CrcdncCGW Data: CookieDataCRC where the name of the domain cookie is "CrcdncCGW Data" and the value is "CookieDataCRC", although these designations are a simple matter of nomenclature. The cookie value contains the following information in a particular example:

| Field | V.1 offset/size | Legal Values |
|---|---|---|
| Version Number | 0/1 | 0 = debug version |
| | | 1 = initial release |
| User Priority | 1/1 | 0–4 |
| Priority Update Interval | 2/1 | 7–12 |
| Hits This Interval | 3/2 | 0–4096 |
| Credits This Interval | 5/3 | any |
| Checksum | 13/4 | 0 |
| Salt | any | any |

In actuality, a domain cookie might look like "1plhhCCCgl6fG" as the cookie information is transmitted in an encoded form. The version offset/size indicates the number of bits used to convey the specified field of information and does not need to be explicitly transmitted as it is implicitly conveyed in the "version number" information. The version number specifies the format of the cookie to allow for future updates by increasing or decreasing the size of particular fields, and providing for the addition or deletion of fields included in the cookie information. The user priority field conveys the DSUP value. The priority update field indicates the effective expiration of the domain cookie by indicating a number of hits before this domain's priority information will be converged with a global value (e.g., by redirection to HTTP redirector 801). The hits this interval field indicates a number of hits recorded in this domain (i.e., www.a.com) during this interval where an interval refers to the time since the domain cookie was last updated by redirection to HTTP redirector 801. Credits this interval indicates the number of page credits recorded in this domain during this interval.

Preferably a checksum field is also included to ensure the cookie data has not been corrupted or tampered with. Because the cookie data is encrypted, any change to the encrypted cookie will alter the checksum bits. When the checksum is not correct, front-end 201 will assume that the cookie has become corrupted and will get a new cookie from HTTP redirector 801 in a manner similar to when a domain cookie does not exist. Front-end 201 preferably does not pass domain cookies to server 210. The domain cookie information is stored in front-end 201 to be used when a response is sent to client 205.

Front-end 201 reads parameters being passed in the request 802, including the Host: parameter described above. As described below, the GET request includes additional parameters when there has been a redirection to/from an HTTP redirector 801. One parameter that is included in a particular example is called a "link code". A back-end 203 writes link codes into all of the web pages that it returns to a client 205 (via a front-end 201). Hence, whenever a user of client 205 follows a hypertext link that points to another page or resource within a domain, the link code can be included in the request. In the particular examples, the link code includes a field to identify the server 210 associated with the link code. Also, the front-end 201 may insert a link code as a parameter in redirect message 815 which is then passed as a parameter to HTTP redirector 801 in message 806, and passed back to client 205 in redirect message 816. Using link codes, it is not necessary to include an additional parameter to identify the host name of server 210 because that information is already included in the link code. Like domain cookies, the link code is preferably stripped from the request before it is passed to server 210.

After receiving the HTTP request, front-end 201 checks cache 403 to see if the requested content is available locally. When the content is not available or is older than specified caching parameters, the request is passed to back-end 203 without link code parameters in a blended packet 803. The blended packet 803 comprises multiple request packets from multiple clients 205. The actual composition of any particular blended packet 803 is determined by the relative priority values associated with each particular request packet 802.

Back-end 203 receives blended packet 803, un-blends it, and forwards each request within the blended packet 803 as an unblended request packet 804 to the corresponding server 210. Any cookies that the site "www.a.com" expects will be included in the HTTP request from back-end 203. From the perspective of each server 210, a conventional HTTP request packet is received and a response 814 is generated including the requested content and/or services. Response 814 may also include priority information (e.g., content priority and/or site-specified user priority) in the form of parameters. Back-end 203 extracts the parameter information from response 814. Back-end 203 also examines each embedded link within response 814 and modifies each link as necessary to ensure that the link is relative to the web site root (if not already) so that redirector 309 does not need to be consulted when the links are followed by a client 205. The links are also modified as necessary to include a link code indicating content priority of the content pointed to by the link.

Back-end 203 maintains a map of the web site and/or services provided by server 210 and content priority associated with each resource within the web site and/or service. Back-end 203 uses this information to associate a content priority with each response 814. Optionally, any given response 814 may also include a parameter indicating a site-specified user priority value (SSUP). In a particular example, the SSUP is encoded as a command in the HTML header of an HTML document being transmitted by response 814 in the form: <!CrcdncPri=x> where "x" is a number between 0 and 4. The SSUP provides a means by which the server 210 can, but is not required to, insert tags, recognizable by back-end 203 into response 814.

Back-end 203 computes an effective priority for each response 814 based upon the content priority, SSUP, and/or the domain-specific user priority included in the link code, if any, transmitted with the request 802. The algorithm and weighting applied by back-end 203 may be independent of the priority and weighting algorithm applied by back-end 201. As a result, the effective priority of a response packet 814 may be different from the effective priority applied to the corresponding request packet 802.

The modified responses 814 are blended according to a computed effective priority value and transmitted in a blended packet 813. Blended packet 813 may comprise multiple response packets 814 in a proportion determined by a weighting algorithm implemented within back-end 203. Where front-end 201 transmits user-identification information to back-end 203, the weighting algorithm may account for DSUP and SSUP in addition to content priority provided by server 210.

Optionally, a cache mechanism (not shown) may be included within back-end 203 to selectively cache content, preferably after link modification described above. When content is cached, back-end 203 may deliver content from the cache rather than generating a request to server 210.

Front-end 201 receives the blended packet 813 and generates an unblended response packet 812 for each response 814 contained therein. Where content is indicated as cacheable, front-end 201 places a copy of the content in its cache as described hereinbefore. From the perspective of client 205, the response 814 appears to have come directly from server 210. Response 814 includes SET cookie information required to update the domain cookie to reflect the new DSUP value, including page credits resulting from the current request.

When a domain cookie is not present, i.e. this client 205 has not visited this domain previously, then the client 205 is redirected to a common domain (e.g. "gateway.circadence.com"), which is running an HTTP redirector application 801. Likewise, when the domain cookie has expired, redirection to HTTP redirector 801 is performed. The HTTP redirector application, in practice, may be implemented on the same physical machine as front-end 201. Also, in the preferred implementations, each domain cookie has a defined expiration after which it should "check in" with the HTTP redirector application 801. The expiration may be measured in terms of time (e.g., every 7 days), usage (e.g., every 1000 times the domain cookie is received by a front-end 201) or other available criteria, including random expiration criteria.

To redirect a client 205 to HTTP redirector 801, client 205 is sent an HTTP Redirect response 815 (e.g., Redirect: gw.circadence.com/index.html?1234?*LinkCdCRC *00000000000*www.a.com HTTP/1.1). The original domain, "www.a.com" is sent as a parameter in the URL. This causes client 205 to perform a DNS lookup on "gateway.circadence.com" and then send HTTP redirector 801 an HTTP GET request. When HTTP Redirector is run as a separate process on front-end 201 the DNS lookup will give the same numerical IP address as returned for the lookup of "www.a.com".

The domain cookie data from the original request to front-end 201 is also sent as a parameter. To indicate that no domain cookie is available, a zeroed cookie is sent. This allows the HTTP redirector the read and write a global cookie in global cookie database 307 as needed. HTTP redirector 801 will receive a request in the form:
GET
index.html?1234?*LinkCdCRC*00000000000*www
.a.com HTTP/1.1
Host: gateway.circadence.com
Cookies: Id: CrcdncCGW Data: GlobalCookCRC HTTP redirector 801 reads the domain cookie parameter and computes a global priority value based upon the DSUP sent in the domain cookie parameter and a stored global user priority (if available). When no domain cookie is available as indicated by a zeroed cookie received in the GET request, HTTP redirector 801 will create a domain cookie based upon a default value.

HTTP redirector 801 sends an HTTP redirection command to client 205, sending client 205 back to front-end 201 and the original domain. When a new domain cookie is created, it is passed to client 205 in the redirect response 816 in the form:
Redirect:
www.a.com?1234?*LinkCdCRC*CookieDataCRC
HTTP/1.1.

The parameter returned contains Domain Cookie data for front-end 201. Front-end 201 stores this updated cookie and write it to client 205 when it sends response message 812. Client 205 will store the domain cookie (e.g., Cookies: Id: CrcdncCGW Data: CookieDataCRC). The cookie, and therefore the user data, will be available directly the next time client 205 connects to this customer domain (e.g., www.a.com).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for prioritizing information within a network comprising the steps:
   receiving at least one set of information within a network;
   appending at least one priority parameter to each of the at least one set of information;
   associating a priority value with each of the at least one set of information based on the at least one priority parameter;
   tracking the priority values associated with each of the at least one set of information requested by a user; and
   transmitting the at least one set of information across the network at least partially based on the priority value of each of the at least one set of information requested by the user;
   wherein the priority value is at least partially based on a value of a priority parameter type, the priority parameter type comprising a session identification and the priority value associated with the session identification type being increased in proportion to the number of transactions completed during a session identified by the session identification.

2. The method of claim 1, wherein the priority value is at least partially based on one or more additional values of a set of priority parameter types, the set of priority parameter types comprising:
   a connection identification;
   a user identification;
   a content identification;

a content type;
a website identification;
a domain content element type; and
a type of connection.

3. The method of claim 1, wherein a network device selectively determines the priority value at least partially based on a value associated with:
a connection identification priority parameter;
a user identification priority parameter;
a content identification priority parameter;
a domain content type priority parameter;
a website identification priority parameter;
a content element type priority parameter; and
a type of connection priority parameter.

4. The method of claim 1, wherein the at least one set of information within a network comprises at least one packet.

5. The method of claim 1, wherein the at least one set of information within a network comprises at least one connection between a client and a web server.

6. The method of claim 1, wherein the network comprises:
at least one intermediary server between at least one client and at least one originating server, wherein the intermediary server is responsible for determining the priority value for the set of information.

7. The method of claim 6, wherein the at least one intermediary server receives a set of priority information via an out-of-band control system.

8. The method of claim 1, wherein the network comprises:
at least one front-end server computer operatively connected to at least one client;
at least one back-end server computer operatively connected to at least one server and to the at least one front-end server computer, wherein the connection to the front-end server computer is implemented over a heterogeneous network.

9. The method of claim 8, wherein the at least one front-end server computer is responsible for determining the priority value for the at least one set of information transmitted to a back-end server.

10. The method of claim 8, wherein the at least one back-end server computer is responsible for determining the priority value for the at least one set of information transmitted to a front-end.

11. The method of claim 8, additionally comprising using an out-of-band management system to translate a priority parameter associated with the at least one set of information into the priority value associated with the at least one set of information.

12. The method claim 11, wherein the out-of-band management system provides a set of priority information to the at least one front-end server computer and the at least one back-end server computer via an out-of-band management system.

13. A method of transmitting requests from a client to a request-specified origin server comprising the acts of:
sending one or more requests from one or more client computers, the requests designating an origin server;
determining for each request whether a request priority parameter is associated with the request;
assigning the request priority parameter to a first priority value;
transmitting the requests to the origin server in an order based upon the first priority value;
generating a response to the request using the origin server;
determining for the response whether a response priority parameter is associated with the response based on a priority associated with content identified in the request;
marking the generated response with priority information;
assigning both the request priority information and the response priority parameter to a second priority value such that the second priority value is based on the number of the requests and the request priority information; and
transmitting the response to the requesting client computers according to the second priority value.

14. The method of claim 13 wherein the request priority parameter is included with the request.

15. The method of claim 13 wherein the request priority parameter is determined by performing a lookup in a table.

16. The method of claim 13 wherein the request priority parameter is obtained from the origin server.

17. The method of claim 13 wherein the step of sending comprises sending the request with an associated domain-specific user priority parameter.

18. The method of claim 13 wherein the step of sending comprises sending the request with an associated content priority parameter.

19. A method of transmitting messages from a source computer to a response-specified destination computer comprising the acts of:
sending a plurality of messages, wherein each message specifies a destination computer;
determining for each message whether the message is associated with a content priority parameter;
determining for each message whether the message is associated with a user priority parameter;
determining for each message whether the message is associated with a request for secure or unsecure resources of the destination computer;
assigning each content priority parameter and each user priority parameter to a composite priority value, wherein the composite priority value is based at least partially upon the number of resources that are requested that are secure and the number of resources that are requested that are unsecure; and
transmitting the messages to the specified destination computers in an order based upon the composite priority value.

20. The method of claim 19 wherein the step of determining comprises obtaining the priority parameter from the source computer.

21. A method of monitoring use of network server resources comprising:
associating a content priority value with each of a plurality of resources that are accessible through the network server, wherein the content priority value is based at least partially upon information associated with each of the plurality of resources;
for each user requesting the resources, tracking the content priority values associated with individual resources requested by the user;
for each user requesting the resources, determining whether the requested resources are secure or unsecure; and
determining a composite priority value for each user wherein the composite priority value based at least partially upon the content priority values of each of the resources that are requested and based at least partially upon the number of resources that are requested that are secure and the number of resources that are requested that are unsecure.

22. A method of monitoring use of network server resources comprising:
providing a first plurality of secure resources and a second plurality of unsecure resources on the network server; and for each user requesting the resources, tracking whether the requested resources are secure or unsecure; and determining a composite priority value for each user wherein the composite priority value is based at least partially upon the number of resources that are requested that are secure and the number of resources that are requested that are unsecure.

* * * * *